United States Patent [19]

Reichel et al.

[11] Patent Number: 4,487,853

[45] Date of Patent: Dec. 11, 1984

[54] LOW ETHYLENE OXIDE/HIGH PRIMARY HYDROXYL CONTENT POLYETHER-ESTER POLYOLS AND POLYURETHANE FOAMS BASED THEREON

[75] Inventors: Curtis J. Reichel; William W. Levis, Jr., both of Wyandotte; Louis C. Pizzini, Grosse Ile, all of Mich.

[73] Assignee: BASF Wyandotte Corporation, Wyandotte, Mich.

[21] Appl. No.: 565,310

[22] Filed: Dec. 27, 1983

[51] Int. Cl.$^3$ ............... C08G 18/14; C08G 18/42; C07C 69/52
[52] U.S. Cl. ............................. 521/172; 521/177; 560/1; 560/89; 560/91; 560/198
[58] Field of Search ................. 521/172, 177; 560/1, 560/91, 89, 198

[56] References Cited

U.S. PATENT DOCUMENTS

| | | | |
|---|---|---|---|
| 2,863,855 | 12/1958 | Wilson et al. | 521/177 |
| 3,089,863 | 5/1963 | Hicks et al. | 528/297 |
| 3,275,678 | 9/1966 | Bernstein et al. | 560/91 |
| 3,431,223 | 3/1969 | Reymore et al. | 560/198 |
| 3,455,886 | 7/1969 | Versnel | 528/297 |
| 3,455,995 | 7/1969 | Bowman et al. | 560/89 |
| 3,459,733 | 8/1969 | Byrd et al. | 521/172 |
| 3,502,601 | 3/1970 | Case et al. | 521/172 |
| 3,718,623 | 2/1973 | Lohse et al. | 521/172 |
| 4,018,815 | 4/1977 | Vogt et al. | 560/89 |
| 4,078,143 | 3/1978 | Malik et al. | 560/89 |

Primary Examiner—Herbert S. Cockeram
Attorney, Agent, or Firm—Norbert M. Lisicki

[57] ABSTRACT

A polyether-ester polyol containing a high primary hydroxyl content is prepared employing low amounts of ethylene oxide. The polyurethane foams prepared from these products display improved physical properties with good air flow.

6 Claims, No Drawings

LOW ETHYLENE OXIDE/HIGH PRIMARY HYDROXYL CONTENT POLYETHER-ESTER POLYOLS AND POLYURETHANE FOAMS BASED THEREON

BACKGROUND OF THE INVENTION

1. Field of the Invention

The present invention relates to a process for the preparation of polyether-ester polyols. More particularly, the invention relates to the preparation of these polyols by reacting a polyoxyalkylene polyether polyol, a cyclic anhydride and 5 percent or less ethylene oxide.

2. Description of the Prior Art

The preparation of polyether-ester polyols by the reaction of an alkylene oxide with a half acid ester obtained by the reaction of a polyol with an unsaturated acid anhydride is well known in the art as taught in U.S. Pat. Nos. 3,931,092, 4,014,846, 4,093,573 and 4,144,395. These patents relate to uncatalyzed or trialkylaminecatalyzed reactions. U.S. Pat. No. 3,374,208 teaches the use of various metal catalysts for the preparation of polyesters. The prior art, however, does not teach the preparation of polyether-ester polyols having a primary hydroxyl content of greater than 50 percent and 5 percent or less ethylene oxide.

SUMMARY OF THE INVENTION

This invention is directed to a process for preparing a polyether-ester polyol comprising reacting a polyoxyalkylene polyether polyol, a cyclic anhydride, and ethylene oxide wherein said polyether-ester polyol has a primary hydroxyl content of greater than 50 percent and 5 percent or less ethylene oxide.

DESCRIPTION OF THE PREFERRED EMBODIMENTS

In the preferred embodiment for the preparation of these polyether-ester polyols, the process comprises (a) reacting a polyoxyalkylene polyether polyol, and tetrahydrophthalic anhydride to form a half acid ester (b) reacting the product of (a) with ethylene oxide in the presence of an effective amount of an amine catalyst or oxides and salts of divalent metals. The concentration of ethylene oxide employed is 5 percent or less based on the weight of polyol. Preferably from 1.5 to 5.0 weight percent. This reaction is conducted at temperatures from about 50° C. to about 175° C., preferably at about 125° C.

Representative polyols which may be employed in the subject invention are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Represenative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the equivalent weight of the polyols will vary from 100 to 10,000, preferably from 1000 to 3000.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and Encyclopedia of Chemical Technology, Vol. 7, pp. 257–262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 100 to 10,000.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxy-containing phosphorus compounds which may be used include those compounds disclosed in U.S. Pat. Nol 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two -SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenediamine, 1,3-diaminopropane, 1,3-diaminobutane, 1,4-diaminobutane, and ammonia.

The alkylene oxides which may be employed for the preparation of the polyether-ester polyols include ethylene oxide, propylene oxide, butylene oxide, amylene oxide and mixtures of these oxides, preferably ethylene and propylene oxide.

The anydrides which may be employed for preparing the polyether-ester polyols of the invention are cyclic organic anhydrides. These include anydrides selected from the group consisting of citraconic anhydride, benzoic anhydride, maleic anhydride, succinic anhydride, methylsuccinic anhydride, phthalic anhydride, tetrahydrophthalic anhydride, hexahydrophthalic anhydride, cyclohexane dicarboxylic acid anhydride, tetrabromophthalic anhydride and tetrachlorophthalic anhydride. Generally, the ratio of anhydride to polyol may range from about 0.8:1 to 1.1:1 and preferably from 1:1 to 1:1 to 1.

The catalyst which may be employed is selected from tertiary amines or oxides and salts of divalent metals. The tertiary amines may be either trialkyl triarylamines or alkylarylamines. These include tertiary alkyl amines containing from 1 to 5 carbon atoms in the alkyl group such as trimethylamine, triethylamine and tripropylamine. The arylamines include such amines as tribenzylamine and triphenylamine. The alkylarylamines include such amines as the dimethyl and diethyl toluidines.

Among the divalent metals which may be employed are: zinc acetate, zinc chloride, zinc oxide, zinc neodecanoate, tin chloride, calcium naphthenate, calcium chloride, calcium oxide, calcium acetate, copper naphthenate, cadmium acetate, cadmium chloride, nickel chloride, manganese chloride, and manganese acetate. The concentration of catalyst employed ranges from 0.005 to 0.05 weight percent based on the weight of the polyol.

The polyurethane foams employed in the present invention are generally prepared by the reaction of the polyether-ester polyols of the invention with an organic polyioscyanate in the presence of additional polyhydroxyl-containing components, chain-extending agents, catalysts, surface-active agents, stabilizers, dyes, fillers and pigments. Suitable processes for the preparation of cellular polyurethane products are disclosed in U.S. Reissue Pat. No. 24,514 together with suitable machinery to be used in conjunction therewith. When water is added as the blowing agent, corresponding quantities of excess isocyanate to react with the water and produce carbon dioxide may be used. It is possible to proceed with the preparation of the polyurethane plastics by a prepolymer technique wherein an excess of organic polyisocyanate is reacted in a first step with the polyol of the present invention to prepare a prepolymer having free isocyanate groups which is then reacted in a second step with water and/or additional polyol to prepare a foam. Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

The polyether-ester polyols may also be employed in the preparation of polyurethane elastomers.

Organic polyisocyanates which may be employed include aromatic, aliphatic, and cycloaliphatic polyisocyanates and combinations thereof. Representative of these types are the diisocyanates such as m-phenylene diisocyanate, 2,4-toluene diisocyanate, 2,6-toluene diisocyanate, mixtures of 2,4- and 2,6-toluene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4''-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful due to their availability and properties are toluene diisocyanate, 4,4'-diphenylmethane diisocyanate and polymethylene polyphenylene polyisocyanate.

Crude polyisocyanates may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)-ethylenediamine, N,N'-di(2-hydroxypropyl)ethylenediamine, piperazine, and 2-methylpiperazine.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

Polyol A—a glycerine propylene oxide adduct having a molecular weight of about 3200.
Polyol B—propylene oxide adduct of glycerine and propylene glycol having a molecular weight of about 3000.
Polyol C—a glycerine propylene oxide adduct having a molecular weight of about 4300.
Polyol D—a glycerine propylene oxide adduct having a molecular weight of about 6500.
Polyol E—a glycerine propylene oxide ethylene oxide heteric adduct containing about 6 percent ethylene oxide and having a molecular weight of about 4300.
Polyol F—a glycerine propylene oxide ethylene oxide heteric adduct containing about 11.5 percent ethylene oxide and having a molecular weight of about 4300.
Polyol G—a glycerine propylene oxide adduct having a molecular weight of about 4400.
Polyol H—a glyercine propylene oxide adduct having a molecular weight of about 4900.
Polyol I—a glycerine propylene oxide adduct having a molecular weight of about 5200.
Polyol J—a trimethylolpropane propylene oxide ethylene oxide adduct having a molecular weight of about 4100, containing 13 percent ethylene oxide and a primary hydroxyl content of 75 percent.
Anhydride A—maleic anhydride
Anhydride B—tetrahydrophthalic anhydride
Anhydride C—succinic anhydride
Anhydride D—phthalic anhydride
Anhydride E—cyclohexane dicarboxylic acid
Anhydride F—citraconic anhydride
TDI—toluene diisocyanate, 2,4-, 2,6-isomers 80/20 ratio
MDI—diphenylmethane diisocyanate
DABCO WT ™—formic acid salt triethylenediamine
DC-5043 ™—silicone surfactant
T-12 ™—dibutylene dilaurate catalyst

EXAMPLES 1-14

The products of Examples 1-14 were prepared by reacting a polyol and an anhydride, as designated in Tables I and II in the ratios indicated at a temperature of about 125° C. for about three hours. Ethylene oxide was then added in the amounts indicated in the tables below and reacted at 125° C. for a period of about six hours. The product was then cooled to 105° and stripped of volatiles for one hour at <10 mm Hg pressure. The resulting physical properties are tabulated in the tables below. Triethylamine was used as the catalyst at a concentration of about 0.1 weight percent based on the total weight of the reactants.

TABLE I

| Example | 1 | 2 | 3 | 4 | 5 | 6 |
|---|---|---|---|---|---|---|
| Polyol | A | B | B | B | C | D |
| Anhydride | A | B | C | D | E | F |
| Anhydride: | 1.1:1 | 1.1:1 | 1.1:1 | 1.1:1 | 1.1:1 | 1.1:1 |
| OH ratio | | | | | | |
| Physical Properties | | | | | | |
| OH No. | 32.9 | 51.4 | 46.3 | 51.1 | 43.2 | 22.7 |
| Sap No. | 66.8 | 93.2 | 96.8 | 92.1 | — | 33.4 |
| % 1° OH | 61 | 79 | 70 | 65.5 | 65.5 | — |
| % Ethylene oxide | 9.75 | 10.4 | 10.8 | 10.3 | 4.5 | 3.4 |

TABLE II

| Example | 7 | 8 | 9 | 10 | 11 | 12 | 13 | 14 |
|---|---|---|---|---|---|---|---|---|
| Polyol | C | C | D | E | F | G | H | I |
| Anhydride | B | B | B | B | B | B | B | B |
| Anhydride: | 1.1 | 1.12:1 | 1:1 | 1:1 | 1:1 | 1.1:1 | 2:1 | 1:3 |
| OH ratio | | | | | | | | |
| Physical Properties | | | | | | | | |
| OH No. | 36.7 | 36.5 | 30.4 | 37.1 | 37.7 | 34.5 | 34.9 | 31.9 |
| Sap No. | 75.7 | 78.0 | 51.6 | 68.9 | 70.1 | 76.3 | 43.9 | 22.3 |
| % 1° OH | 80 | 86.5 | 76 | 79 | 80.5 | 73.5 | 53.5 | 27.5 |
| % Ethylene oxide | 4.6 | 4.8 | 3.4 | 4.4 | 4.5 | 5.0 | 3.1 | 1.5 |

EXAMPLES 15-26

The foams of Examples 15 to 23 were prepared by employing the following formulation:

| | pbw |
|---|---|
| Polyol | 100 |
| TDI/MDI (80/20 blend) | 40.3 |
| DABCO WT | 0.7 ml |
| Water | 3.0 |
| DC-5043 | 2.0 ml |
| T-12 | 0.02 ml |
| Isocyanate Index | 105 |

The foams of Examples 24-26 were prepared employing the formulation:

| | pbw |
|---|---|
| Polyol | 300 |
| TDI/MDI (80/20 blend) | 121 |
| Dabco WT | 1.5 |
| DC-5043 | 6.0 |
| T-12 | 0.24 |
| Water | 9 |
| Isocyanate Index | 105 |

The polyol, water, DC-5043 and Dabco WT were mixed for 30 seconds in a container. The T-12 catalyst was added and the mixture was stirred for 15 seconds. The TDI/MDI blend was added with stirring, mixed for 8 seconds, poured into a suitable container and the foam was allowed to rise. The resulting foam was cured in an oven at 110° C. for 10 minutes. The foam properties of the invention display greater tensile strength, elongation, tear strength and higher ILD with good air flow inspite of the high primary hydroxyl content. The foam of Example 26 collapsed after about a 150 second time rise.

TABLE III

| Example | 15 | 16 | 17 | 18 | 19 | 20 | 21 | 22 | 23 |
|---|---|---|---|---|---|---|---|---|---|
| Polyol of Example | — | 4 | 7 | 8 | 8 | 9 | 10 | 11 | 3 |
| Physical Properties | | | | | | | | | |
| Density, pcf | 1.8 | 2.0 | 1.9 | 1.9 | 2.0 | 2.0 | 2.0 | 2.1 | 1.8 |
| Tensile Strength, psi | 11.8 | 16.7 | 14.0 | 15.7 | 18.4 | 22.0 | 19.3 | 18.9 | 13.2 |
| Elongation, % | 123 | 113 | 117 | 190 | 186 | 280 | 193 | 180 | 110 |

TABLE III-continued

| Example | 15 | 16 | 17 | 18 | 19 | 20 | 21 | 22 | 23 |
|---|---|---|---|---|---|---|---|---|---|
| Polyol of Example | — | 4 | 7 | 8 | 8 | 9 | 10 | 11 | 3 |
| Physical Properties | | | | | | | | | |
| Tear Strength, pi | 1.0 | 1.1 | 1.3 | 1.3 | 1.4 | 2.2 | 1.6 | 1.4 | 1.0 |
| ILD (lb./sq. in.) | | | | | | | | | |
| 25% deflection | 10.8 | 13.1 | 11.8 | 12.7 | 13.3 | 11.5 | 13.3 | 14.4 | 13.4 |
| 65% deflection | 27.2 | 41.4 | 28.0 | 29.4 | 31.5 | 26.2 | 33.4 | 36.7 | 48.9 |
| 25% return | 9.2 | 10.1 | 10.0 | 10.5 | 12.1 | 9.7 | 11.1 | 11.7 | 10.0 |
| Sag Factor | 2.52 | 3.16 | 2.37 | 2.31 | 2.37 | 2.28 | 2.51 | 2.55 | 3.65 |
| Guide Factor | 5.9 | 6.7 | 6.2 | 6.6 | 6.8 | 5.9 | 6.7 | 7.0 | 7.4 |
| % Recovery | 85.2 | 77.1 | 84.7 | 82.7 | 91.0 | 84.3 | 83.5 | 81.3 | 74.6 |
| CLD (psi) | | | | | | | | | |
| 50% deflection | 0.21 | — | — | — | 0.25 | 0.22 | 0.25 | 0.26 | — |
| Compression Set, % set | | | | | | | | | |
| 50% compression | 20.5 | 33.1 | 19.9 | 19.6 | 24.4 | 26.7 | 29.5 | 23.9 | 30.9 |
| 90% compression | 71.0 | 88.4 | 73.9 | 75.9 | 87.2 | 88.3 | 91.6 | 92.1 | 73.5 |
| Air flow, crm @ 0.5" H$_2$O | 0.4 | 1.15 | 1.05 | 0.8 | 1.05 | 0.73 | 0.4 | 0.26 | 0.1 |

The polyol of Example 15 was Polyol J.

TABLE IV

| Example | 24 | 25 | 26 |
|---|---|---|---|
| Polyol of Example | 12 | 13 | 14 |
| Physical Properties | | | |
| Density, pcf | 2.20 | 1.94 | Foam Collapsed |
| Tensile Strength, psi | 19.3 | 17.0 | |
| % Elongation | 210 | 210 | |
| Tear Strength, pi | 1.7 | 1.9 | |
| I.L.D. (lb./50 sq. in.) | | | |
| Load at 25% deflection | 9.7 | 7.8 | |
| Load at 65% deflection | 32.5 | 20.7 | |
| Load at 25% return | 7.8 | 6.5 | |
| Sag Factor | 3.35 | 2.65 | |
| Guide Factor | 4.4 | 4.0 | |
| % Recovery | 80.4 | 83.3 | |
| C.L.D., psi | | | |
| Load at 25% deflection | .11 | .09 | |
| Load at 50% deflection | .21 | .15 | |
| Load at 65% deflection | .40 | .27 | |
| Compression Sets | | | |
| % set at 50% compression | 49.4 | 42.8 | |
| % set at 90% compression | 90.6 | 94.3 | |
| Air Flow, cfm @ 0.5" H$_2$O | .23 | 1.23 | |

The embodiments of the invention in which an exclusive privilege or property is claimed are defined as follows:

1. A process for the preparation of a high primary hydroxyl content polyether-ester polyol which comprises reacting at a temperature of 50° C. to 125° C.

(a) a condensate of a polyhydric alcohol containing from 2 to 8 hydroxy groups and an equivalent weight ranging from 30 to 45 and an alkylene oxide containing from 2 to 4 carbon atoms and mixtures thereof said condensate having an equivalent weight of 500 to 10,000 and said condensate reacted with a cyclic organic acid anhydride, forming a half acid ester and (b) ethylene oxide, in the presence of an effective amount of an amine or oxide or salt of a divalent metal catalyst wherein the ratio of equivalents of the anhydride to equivalents of the condensate range from about 1:1 to about 1:2 and wherein the ratio of moles of ethylene oxide to moles of anhydride range from about 2:1 to about 1.5:1.

2. the process of claim 1 wherein the concentration of ethylene oxide is from 1.5 to 5 weight percent based on the weight of the polyol.

3. The process of claim 1 wherein the acid anhydride is selected from the group consisting of maleic anhydride, tetrahydrophthalic anhydride, succinic anhydride, and phthalic anhydride.

4. The process of claim 1 wherein the concentration of catalyst ranges from 0.005 to 0.5 weight percent based on the weight of the polyol.

5. The product produced by the process of claim 1.

6. A polyurethane product prepared from the reaction of an organic polyisocyanate and the product of claim 5.

* * * * *